T. H. RAY.
ICE MAKING MACHINE.
APPLICATION FILED JULY 16, 1908.
923,298.
Patented June 1, 1909.
3 SHEETS—SHEET 1.
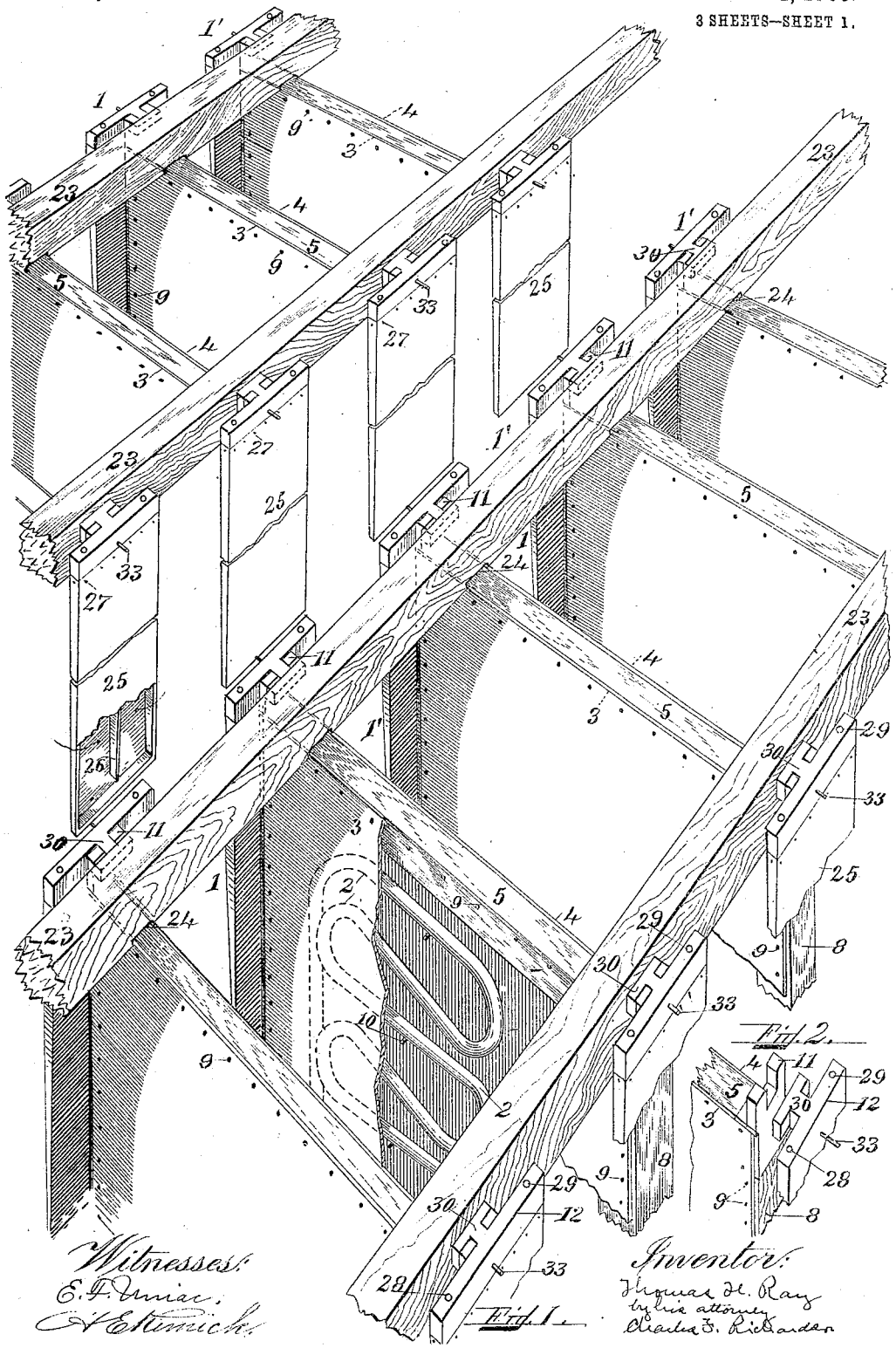

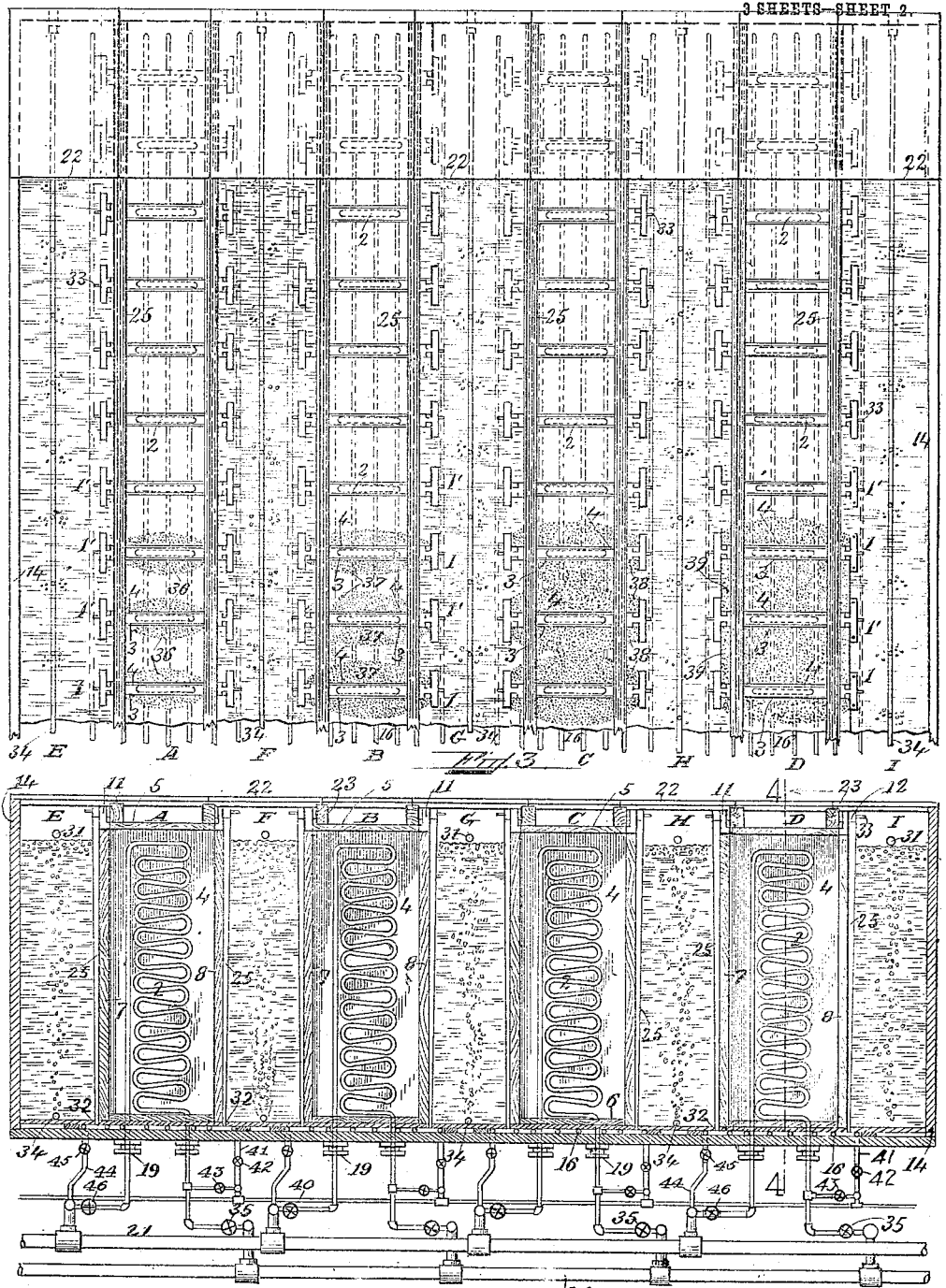

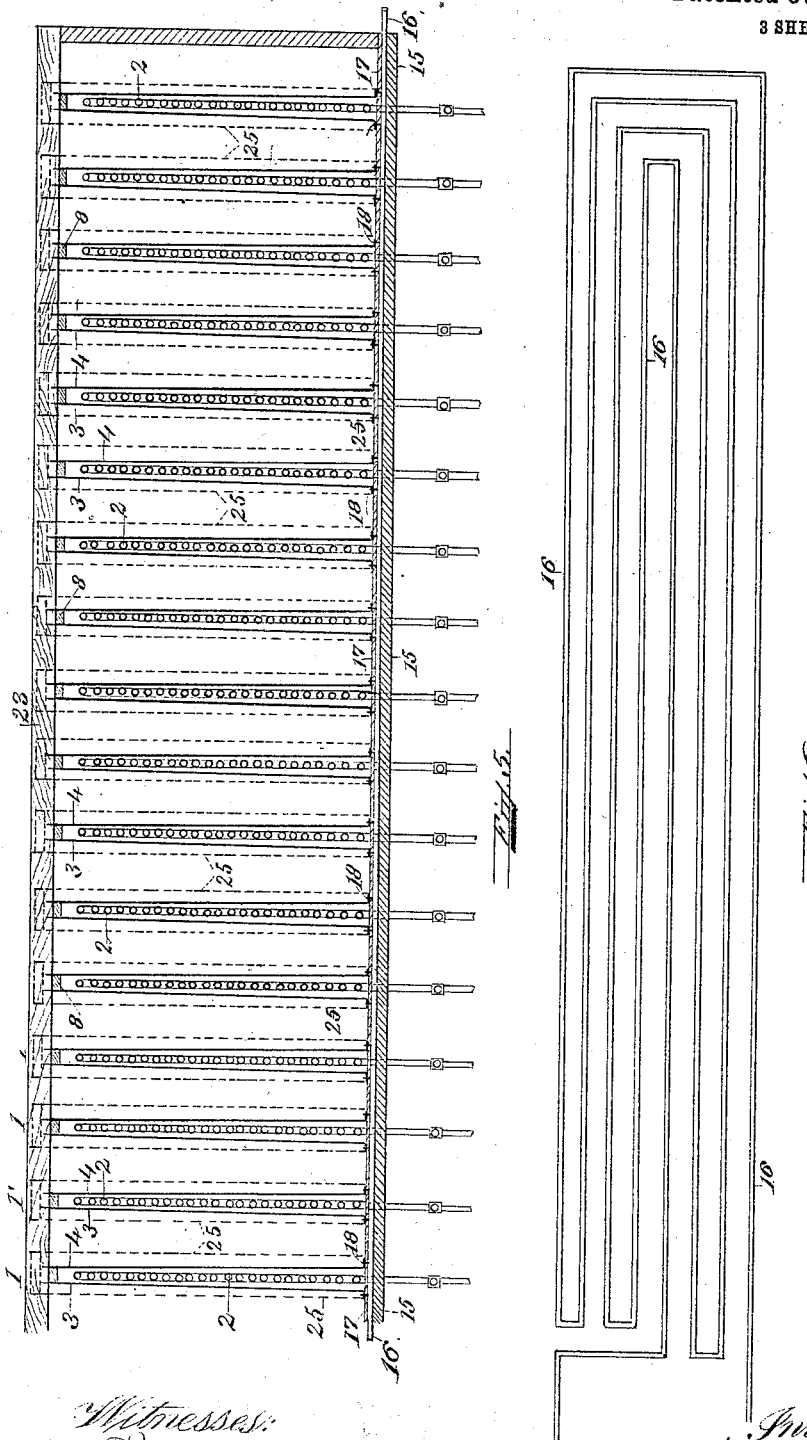

UNITED STATES PATENT OFFICE.

THOMAS H. RAY, OF SOMERVILLE, MASSACHUSETTS, ASSIGNOR TO HILL-RAY ENGINEERING COMPANY, OF BOSTON, MASSACHUSETTS, A CORPORATION OF MASSACHUSETTS.

ICE-MAKING MACHINE.

No. 923,298.  Specification of Letters Patent.  Patented June 1, 1909.

Application filed July 16, 1908. Serial No. 443,792.

*To all whom it may concern:*

Be it known that I, THOMAS H. RAY, a citizen of the United States, residing at Somerville, in the county of Middlesex and State of Massachusetts, have invented certain new and useful Improvements in Ice-Making Machines, of which the following is a specification, reference being had therein to the accompanying drawing.

My invention relates to ice making machines. Its principal objects are first, to provide means whereby there may be formed, at a speed much greater than that attained heretofore, a block of artificial ice having a predetermined depth, or thickness. Second, to provide means whereby such a block may be formed having a desired width. Third, to provide means whereby said block may be quickly and easily harvested. Fourth, to provide means whereby there may be formed a block of clear artificial ice, having the desired thickness, width and length.

The first object is attained by means of two substantially vertical freezing plates, immersed in water, and arranged at such a distance apart, that within a definite period of time, a single block may be formed out of two blocks which are formed on said two plates, approach and touch each other and freeze together.

The second object is accomplished by providing four heat insulated surfaces, two for each of said freezing plates, and so arranging said insulated surfaces and said freezing plates, that said heat insulated surfaces compel the block formed upon each freezing plate, to conform to said surfaces, and also determine the width of said two blocks which ultimately unite and become a single block having the desired width and thickness.

The third object—a quick and easy harvesting of a block of ice obtained by the above mentioned means—is brought about by so forming said heat insulated surfaces that by the application of heat to said surfaces, they become disengaged from the ice, and may then be removed, so that the resulting single block of ice formed by the two freezing plates may be floated, and the harvesting completed.

The fourth object, namely, a clear block of ice formed as above, is attained by so arranging the two freezing plates and their heat insulated surfaces that there is formed between one freezing plate with its two heat insulated surfaces, and the other freezing plate with its two heat insulated surfaces, a water channel; and by also providing means located outside of said channel, to agitate the water to be frozen, in said channel.

Figure 1 is a perspective view of two series of freezing apparatus embodying my invention, which may be employed for making and harvesting separate blocks of ice having a predetermined length, breadth and thickness. Fig. 2 is a like view of details showing the means to removably secure a heat insulated surface in proper relation to a metal freezing surface. Fig. 3 is a plan view of four series of freezing apparatus, and shows four stages in the formation of blocks of clear ice having the desired shape and size. Fig. 4 is a transverse elevation showing the piping, heat insulated surfaces, freezing coils, and the back freezing plate of each of four freezing coils; the first freezing plate of each coil having been removed to show the relative positions of the above parts. Fig. 5 is a longitudinal vertical section on line 4—4 in Fig. 4. Fig. 6 is a plan showing hot gas piping extending under each series of freezing coils or units, for releasing the ice blocks from the flooring of the water tank.

To form a clear block of ice having the desired shape and size, I make use of two freezing coil units 1, 1', identical in construction and operation. Coil unit 1 has a flat freezing coil 2 which is vertically mounted between two thin metal freezing plates 3, 4, separated and insulated from each other as by strips of wood 5, 6, 7, 8, Fig. 4, to which the plates are secured by rivets 9, Fig. 1; the coils in turn being secured between the plates by pins 10 passing through the plates and under the turns of the freezing coil. The wooden insulating strips 5, 6, Figs. 1 and 4, at the top and bottom are flush with the top and bottom edges of the plates 3, 4, while the wooden strips 7, 8, Figs. 1, 2, 4, at the sides extend beyond the side edges of the plates, as clearly appears in detail in Fig. 2.

Riveted between the upper adjacent corners of the two freezing plates 4, 5, Figs. 2, 4, are two cast iron slotted supporting pieces 11 extending above the top of the plates, and designed to be engaged by a T shaped locking member 12 forming the top portion of heat insulated device 13 to be described later.

What we have described, namely, a freezing coil, its two adjacent plates, wooden insulating frame, and slotted supporting pieces, comprise the freezing coil unit 1. It is two such units 1, 1', which I employ in making a block of ice. To manufacture and make blocks of ice in quantities, I arrange these units in one or more series, as shown in the drawings. A tank 14 for the water to be frozen, is provided. Upon the floor 15 of the tank under the location of each series of units, is a hot gas coil 16 shown in Figs. 3, 4, 5, 6, while covering the hot gas coil and the rest of the bottom of the tank is a thin wooden flooring 17 upon which the units as 1, 1', Fig. 5 are arranged at suitable distances apart, and secured to the floor by bolts 18 through holes in the flanged bottoms of the freezing plates 3, 4. The ends of each freezing coil pass down through the floor of the tank and suitable stuffing boxes 19, Figs. 4 and 5, and are connected to a supply pipe 20 and a return pipe 21, for a refrigerating agent as ammonia or brine. To render the units still more rigid so as to support covers 22 and the persons operating the ice making plant, two lines of wooden girders 23, slotted, as at 24, Fig. 1, rest upon and engage the tops of the series units. These units having become rigidly supported, suitable heat insulated surfaces 13 are next provided, and removably mounted in proper relation to each freezing coil. This heat insulated surface may, for example, be similar to that of a "cross cut" device which is described and claimed in United States Letters Patent for ice making apparatus, No. 876,015, and issued to me, January 7, 1908. It consists of a can 25 which is made of thin metallic material, as iron, is rectangular in cross section, and has its side surfaces slightly converging from the top to the bottom. A partition 26, Fig. 1, to form two vertical chambers in the can extends down between the inside surfaces of the can nearly to the bottom, so that the chambers are there connected. The lock member 12, of cast iron, fits into the top opening of the can where it is fixed by rivets 27. Two holes 28, 29, lead through this member into the chambers of the can, one for each, for the introduction and the withdrawal of a heat radiating liquid, as hot water. Projecting from the middle portion of this member is a T shaped piece 30, Fig. 2, which is designed to engage the slotted supporting piece 11, forming part of the above mentioned freezing coil unit. Two of these cross cuts are provided for each unit coil, and are so mounted in their slotted supports, that they are at right angles to the planes of the freezing plates, from which they extend outward the desired distance. It is to be noted that the lock member 12 of the cross cut, adjacent to each coil does not contact the freezing plates 3, 4, but does touch the wooden insulating strips 7, 8, projecting beyond the outside edges of the plates. It is to be further noticed that the water outlets 31 of the tank, Fig. 4, are below the tops of the freezing plates and the wooden side strips, so that so much of the metallic surface of the cross cut as is immersed in the water, becomes insulated from the freezing plate or plates by the wooden side strip, and becomes, not a freezing surface as it would were it in direct contact with the freezing plate or plates, but a surface which compels the ice formed by either freezing plates to conform to said surface.

In order that each cross cut may be held close to its wooden side strip, a groove 32 is made in the floor of the tank, so that by pushing the cross cut down along the side strip, its bottom engages the groove, and its lock member 12 becomes locked to the slotted sustaining member 11. To remove each cross cut, a pin 33 projects from the outer face of the lock member, so that it can be caught as by a hand hook, and the cross cut lifted up and away from the freezing plates.

Outside of each series of units, A, B, C, D, Figs. 3, 4, and upon the floor of the water tank is an agitating pipe 34, having openings through which air may be forced to keep the water in motion to insure the production of ice clear and transparent in appearance. By such an arrangement of the agitating means, they are outside the sphere of action of the freezing plates, they never become frozen, and they may be controlled not only during but after the freezing is completed.

Having described the construction of the various features of my invention, I will now describe its operation, having Figs. 3 and 4 in mind, particularly. The water tank 14 is filled with water, which becomes agitated by air allowed to escape from the air pipes 34 in the aisles E, F, G, H, I, formed in the tank by the four series of ice forming units, A, B, C, D. The liquid ammonia in the liquid supply pipe 20, is allowed to pass through expansion valves 35, through each freezing coil 2, valve 46 and enter the return gas pipe 21. In so doing the freezing plates 3, 4, of each unit become cold, and ice begins to form on each plate of each coil, as is indicated by dots 36, in series A, Fig. 3. As time goes on, the ice formed on each plate builds out and comes into contact with the two end cross cut cans 25, as indicated by dots 37, series B, Fig. 3. But as each block grows larger and approaches its neighbor, across the water channel between the adjacent freezing units, the cross cut begins to limit the formation of ice along the plane of its freezing plate, and the ice freezes against the metallic insulated surface of each empty cross cut, as shown by dots 38, series C, Fig. 3; the adjacent blocks continue to build out, touch each other, and begin to freeze together. The combined single block keeps on freezing in the direction of its width. If the water agitation is so vigorous that the block does not build out, and remains imperfect as appears in series C, then the agitation must be reduced. By proper regulation of the agitation of the water, the block will build out so that it will have a substantially uniform width as is shown by dots in series D, Fig. 3; and when it has such width, the agitation is stopped, and all of the completely formed blocks are ready for harvesting.

In harvesting the ice there is employed a hot gas feed pipe 40 leading, say, from the compression side of an ammonia compression machine, not shown. A branch pipe 41, as for series of freezing coils D, in turn, leads from said hot gas pipe 40, into hot gas coil 16, and has a valve 42. Also leading from this branch hot gas pipe 41 is another branch pipe having a valve 43 and connected to the cold liquid pipe supplying cold liquid from the main supply pipe 21 to each freezing coil 2. A branch pipe 41 having a valve 45 connects the other end of the hot gas coil 16 to the main return pipe 21; there being a valve 46 in the pipe connecting the freezing coil 2 to the main return pipe 21.

To harvest the ice the expansion valves 35 of the coils, as in series D, are closed, and the ammonia in the freezing coils is recovered in the well known way through the return pipe 21 which is connected to the suction side, say, of a compression machine not shown. Next hot gas is pumped from the compression side of the ammonia compressor through the hot gas pipe 40, by the valve 42, and valves 43 respectively into the coil 16 and the empty freezing coils 2; the valves 45, 46, in the return branch pipes, being opened a crack to permit the coils 16 and 2 to be filled with the desired quantity of hot gas. These valves are then closed and the hot gas is allowed to stand in the coils for the purpose of giving out heat. Hot water is next introduced through one hole 28 in each cross cut. By these operations, the thin films of ice attaching each complete block to the apparatus, are melted. The cross cuts being freed from their respective blocks, they may be removed, as with hand hooks by lifting them out of their grooves 32 in the floor and their slotted supporting pieces 11, and the blocks of ice become freed in the direction of their width. As the two freezing plates 4, 3, forming the completed block flare slightly outward from the bottom toward the top, see Fig. 5, the disengaged block is free to rise and does so, thereby floating in the water, and becoming ready for removal and storage.

What is true of one complete block, is true of all of the blocks formed in the series of freezing coil units.

It will now be plain how a block of ice having a predetermined depth can be produced at greatly increased speed; how it can also have a predetermined width; how it can be harvested; and how it can be made clear in appearance. It will also be clear that, for economy in construction where there is to be a series of units to form two or more complete blocks, each unit has two freezing plates, which, however, do not form the two cakes that freeze together into one large block. Any ice formed on the outside plate of an end unit coil of a series, will not be of the shape and size desired for marketing. But such pieces are useful if allowed to remain in the tank, for they melt and tend to keep the water nearer a freezing temperature. The same may be said of the other small bits of ice, should any be formed outside of the cross cuts.

It is to be noted that the hot gas tends to condense in the freezing coils, and if, after the ice is removed, the freezing plates are again to do refrigeration, the freezing coils will begin refrigeration upon the opening of the valves 46; the liquid ammonia in the freezing coils starting at once to evaporate. In this way, the heat that would otherwise be lost by the hot gas recovered through the return pipe 21 and passed through a condenser, is used in the freezing coils in thawing the ice off the freezing plates, and is there condensed, ready to do refrigeration the moment its pressure is relieved by the opening of valves 46 leading into the low pressure return pipe 21. Obviously the ammonia in the coil 16 will be removed by opening the valves 45.

In fine, by my invention I am enabled to quickly make, and harvest a clear block of ice having the desired shape and size.

Having described my invention, its construction, and operation, and desiring to protect the same in the broadest manner legally possible,

What I claim is:—

1. Two freezing plates immersed in water, located at such a distance apart that a single block of ice may be formed by freezing together two pieces of ice, one formed on each plate; a receptacle arranged at each end of each freezing plate, with heat insulation between said plates and said receptacles, said receptacles being so mounted in relation to said plates that they determine the width of each piece of ice formed on each plate.

2. Two freezing plates immersed in water located at such a distance apart that a single block of ice may be formed by freezing together two pieces of ice, one formed on each plate; a receptacle arranged at each end of each freezing plate, with heat insulation between said plates and said receptacles, said receptacles being so mounted in relation to said plates that they determine the width of each piece of ice formed on each plate; and means located outside of a channel formed between said two freezing plates, whereby the water in the channel may be agitated so that the resulting ice may be clear in appearance, and the said agitating means may not become frozen.

3. An ice forming unit consisting of two freezing plates; a freezing coil mounted between said plates; two metal cans mounted adjacent to the side edge of, at right angles to, said plates, and extending beyond the planes of said plates; and means to insulate said cans from said plates.

4. An ice forming unit consisting of two freezing plates; a freezing coil mounted between said plates; heat insulating strips to separate said plates; the strips between the side portions of said plates extending beyond the side edges of said plates; a hollow metal can removably mounted at right angles to, and extending beyond the planes of, said freezing plates; said cans being insulated from said plates by said insulating strips extending beyond the side edges of said plate.

5. An ice forming unit consisting of two freezing plates; a freezing coil mounted between said plates; heat insulating strips to separate said plates; the strips between the side portions of said plates extending beyond the side edges of said plates; two hollow metal cans, each removably mounted at right angles to, and extending beyond the planes of, said freezing plates; said cans being insulated from said plates by said insulating strips extending beyond the side edges of said plate, and also having a partition, each, whereby there are formed in each can two chambers connected at the bottom of the can, so that hot water poured into one chamber will flow into the other; and means whereby the freezing plates may be heated for the purpose of releasing the ice formed on the plates.

In testimony whereof I affix my signature in presence of two witnesses.

THOMAS H. RAY.

Witnesses:
 WALTER L. HILL,
 F. J. V. DAKIN.